United States Patent
Hirano (10) Patent No.: US 11,546,478 B2
(45) Date of Patent: Jan. 3, 2023

(54) CORRECTING BACK SIDE IMAGE DATA BASED ON POSITIONS OF FOUR CORNER DETECTION MARKS SPECIFIED USING GROUND COLOR LUMINANCE

(71) Applicant: Noboru Hirano, Kanagawa (JP)

(72) Inventor: Noboru Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/542,620

(22) Filed: Dec. 6, 2021

(65) Prior Publication Data

US 2022/0201127 A1 Jun. 23, 2022

(30) Foreign Application Priority Data

Dec. 21, 2020 (JP) .............................. JP2020-211461

(51) Int. Cl.
*H04N 1/00* (2006.01)
*H04N 1/387* (2006.01)

(52) U.S. Cl.
CPC ..... *H04N 1/00015* (2013.01); *H04N 1/00045* (2013.01); *H04N 1/00068* (2013.01); *H04N 1/00082* (2013.01); *H04N 1/3872* (2013.01); *H04N 1/3878* (2013.01)

(58) Field of Classification Search
None
See application file for complete search history.

(56) References Cited

U.S. PATENT DOCUMENTS

| 8,411,327 | B2 * | 4/2013 | Yamagishi | G03G 15/5025 358/3.1 |
|---|---|---|---|---|
| 9,848,098 | B2 * | 12/2017 | Mita | H04N 1/0057 |
| 10,081,209 | B2 * | 9/2018 | Barron | B41J 29/393 |
| 11,420,450 | B2 * | 8/2022 | Maeyama | B41J 11/0045 |
| 2020/0106907 | A1 | 4/2020 | Hirano et al. | |
| 2021/0146701 | A1 | 5/2021 | Maeyama et al. | |
| 2021/0385346 | A1 * | 12/2021 | Esumi | H04N 1/00708 |
| 2022/0072875 | A1 * | 3/2022 | Hirano | B41J 11/0095 |
| 2022/0091797 | A1 * | 3/2022 | Sakamoto | G06K 15/027 |
| 2022/0109767 | A1 * | 4/2022 | Takahashi | B41J 11/0095 |

FOREIGN PATENT DOCUMENTS

| JP | 2008-271473 | 11/2008 |
|---|---|---|
| JP | 2013-074474 | 4/2013 |

* cited by examiner

*Primary Examiner* — Scott A Rogers
(74) *Attorney, Agent, or Firm* — Harness, Dickey & Pierce, P.L.C.

(57) ABSTRACT

An image scanner includes a conveyance path and a conveyor that conveys a medium through the conveyance path. The medium bears a detection mark that is spaced from a leading edge of the medium in a medium conveyance direction. A background member is disposed opposite the conveyance path. A luminance sensor is disposed opposite the background member via the conveyance path. The luminance sensor detects a luminance value of each of the background member and the medium. A controller controls the luminance sensor to detect the luminance value at a plurality of times while the conveyor conveys the medium so as to obtain a plurality of detected luminance values. The controller determines a ground color luminance value of a ground color area on the medium based on a determination range including a first peak luminance value among the plurality of detected luminance values.

14 Claims, 8 Drawing Sheets

FIG. 7

CORRECTING BACK SIDE IMAGE DATA BASED ON POSITIONS OF FOUR CORNER DETECTION MARKS SPECIFIED USING GROUND COLOR LUMINANCE

CROSS-REFERENCE TO RELATED APPLICATION

This patent application is based on and claims priority pursuant to 35 U.S.C. § 119(a) to Japanese Patent Application No. 2020-211461, filed on Dec. 21, 2020, in the Japan Patent Office, the entire disclosure of which is hereby incorporated by reference herein.

BACKGROUND

Technical Field

Exemplary aspects of the present disclosure relate to an image scanner, an image forming apparatus, and an image forming method, and more particularly, to an image scanner, an image forming apparatus incorporating the image scanner, and an image forming method performed by the image forming apparatus.

Discussion of the Background Art

Related-art image forming apparatuses, such as copiers, facsimile machines, printers, and multifunction peripherals (MFP) having two or more of copying, printing, scanning, facsimile, plotter, and other functions, typically form an image on a medium according to image data.

The image forming apparatus includes an image scanner that reads the image formed on the medium. The image forming apparatus analyzes the image read by the image scanner and controls subsequent image forming processing.

SUMMARY

This specification describes below an improved image scanner. In one embodiment, the image scanner includes a conveyance path and a conveyor that conveys a medium through the conveyance path. The medium bears a detection mark that is spaced from a leading edge of the medium in a medium conveyance direction. A background member is disposed opposite the conveyance path. A luminance sensor is disposed opposite the background member via the conveyance path. The luminance sensor detects a luminance value of each of the background member and the medium. A controller controls the luminance sensor to detect the luminance value at a plurality of times while the conveyor conveys the medium so as to obtain a plurality of detected luminance values. The controller determines a ground color luminance value of a ground color area on the medium based on a determination range including a first peak luminance value among the plurality of detected luminance values.

This specification further describes an improved image forming apparatus. In one embodiment, the image forming apparatus includes an image forming device that forms a front side image and a back side image on a front side and a back side of a medium, respectively, and the image scanner described above that is disposed downstream from the image forming device in a medium conveyance direction.

This specification further describes an improved image forming method. In one embodiment, the image forming method includes forming a detection mark in each of four corners on a front side of a medium at a position spaced from one of a leading edge and a trailing edge of the medium in a medium conveyance direction so as to form four detection marks on the medium, forming a front side image in an enclosed area enclosed by the four detection marks, determining a ground color luminance value of a ground color area on the medium formed with the four detection marks and the front side image, determining a detection threshold used to detect the four detection marks based on the determined ground color luminance value, specifying positions of the four detection marks formed in the four corners on the front side of the medium, respectively, by using the determined detection threshold, correcting back side image data for a back side image to be formed on a back side of the medium based on the specified positions of the four detection marks, respectively, and forming the back side image on the back side of the medium according to the corrected back side image data.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", arid "the" are intended to include the plural forms as well, unless the context clearly indicates otherwise.

Figure 1:
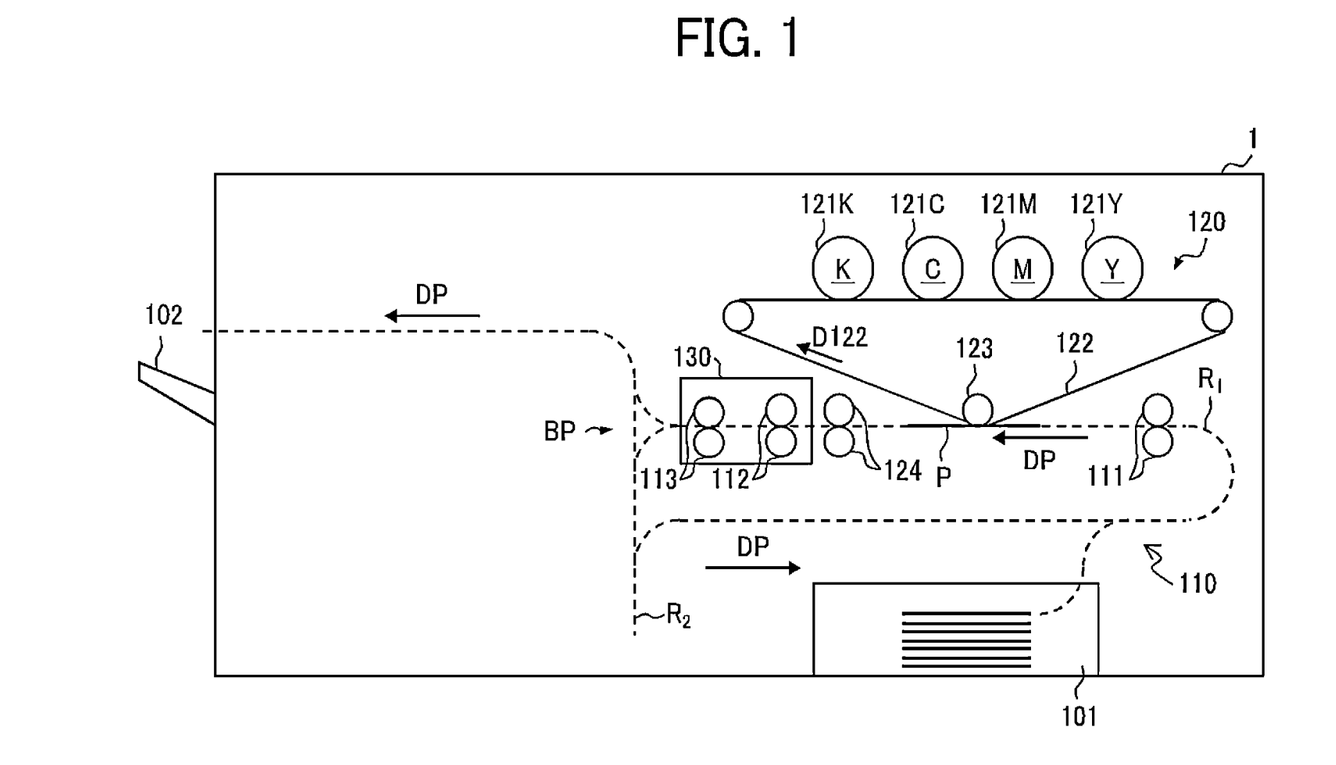
FIG. 1 is a schematic cross-sectional view of an image forming apparatus according to an embodiment of the present disclosure, illustrating an entire construction of the image forming apparatus.

FIG. 1 is a schematic cross-sectional view of an image forming apparatus 1 according to an embodiment of the present disclosure, illustrating an entire construction of the image forming apparatus 1. As illustrated in FIG. 1, the image forming apparatus 1 mainly includes a sheet tray 101, an output tray 102, a conveying portion 110, an image forming portion 120, and a reading portion 130 serving as an image scanner. The sheet tray 101 loads a plurality of sheets P to be formed with images (e.g., toner images), respectively, in a state in which the sheets P are layered on the sheet tray 101. The output tray 102 stacks the sheets P formed with the images, respectively.

The sheet P is one example of a medium which is conveyed by the conveying portion 110. The image forming portion 120 serving as an image forming device forms an image on the sheet P. The reading portion 130 reads a luminance value of the sheet P. For example, the sheet P is cut paper that is cut into a sheet having a predetermined size (e.g., an A4 size and a B5 size) in advance. The sheet P is made of paper, cloth, or the like woven with fiber that stretches and shrinks as the sheet P is formed with the image.

The image forming apparatus 1 accommodates a main conveyance path $R_1$ and a reverse conveyance path $R_2$ as spaces through which the sheet P fed from the sheet tray 101 is conveyed. The main conveyance path $R_1$ extends from the sheet tray 101 to the output tray 102 through the image forming portion 120. The reverse conveyance path $R_2$ branches from the main conveyance path $R_1$ at a node BP disposed downstream from the reading portion 130 in a sheet conveyance direction DP and rejoins the main conveyance path $R_1$ at a position upstream from the image forming portion 120 in the sheet conveyance direction DP.

Specifically the reverse conveyance path $R_2$ is a switchback path that reverses the sheet P formed with an image on a front side of the sheet P and guides the sheet P to the image forming portion 120 again. The reverse conveyance path $R_2$ reverses the sheet P such that the reverse conveyance path $R_2$ interchanges a leading edge of the sheet P with a trailing edge of the sheet P in the sheet conveyance direction DP. The reverse conveyance path $R_2$ guides the sheet P to a position disposed opposite the image forming portion 120 again through the main conveyance path $R_1$.

The conveying portion 110 conveys the sheet P through the main conveyance path $R_1$ and the reverse conveyance path $R_2$. For example, the conveying portion 110 conveys the sheet P picked up from the sheet tray 101 through the main conveyance path $R_1$ to the position disposed opposite the image forming portion 120. The conveying portion 110 reverses the sheet P formed with the image on the front side of the sheet P while the sheet P is conveyed through the reverse conveyance path $R_2$ and conveys the sheet P to the position disposed opposite the image forming portion 120 again. The conveying portion 110 conveys the sheet P formed with another image on a back side of the sheet P through the main conveyance path $R_1$ and ejects the sheet P onto the output tray 102.

The conveying portion 110 includes a plurality of conveyance roller pairs 111, 112, and 113. For example, each of the conveyance roller pairs 111, 112, and 113 is constructed of a driving roller and a driven roller. As a driving force is transmitted from a motor to the driving roller, the driving roller rotates. The driven roller contacts the driving roller and rotates in accordance with rotation of the driving roller. As the driving roller and the driven roller sandwich the sheet P and rotate, the sheet P is conveyed through the main conveyance path $R_1$ and the reverse conveyance path $R_2$.

The conveyance roller pair 111 is disposed upstream from the image forming portion 120 in the sheet conveyance direction DP. The conveyance roller pairs 112 and 113 are disposed downstream from the image forming portion 120 and disposed upstream from the node BP in the sheet conveyance direction DP. In addition to the conveyance roller pairs 111, 112, and 113, the conveying portion 110 further includes other conveyance roller pairs including a conveyance roller pair that conveys the sheet P through the reverse conveyance path $R_2$.

The image forming portion 120 is interposed between the conveyance roller pairs 111 and 112 in the sheet conveyance direction DP and is disposed opposite the main conveyance path $R_1$. The image forming portion 120 forms images on the front side and the back side of the sheet P, respectively, which is conveyed by the conveying portion 110. The image forming portion 120 according to this embodiment forms toner images on the sheet P conveyed through the main conveyance path $R_1$ with an electrophotographic system.

The image forming portion 120 includes photoconductive drums 121Y, 121M, 121C, and 121K, a conveyance belt 122, and a transfer roller 123. The image forming portion 120 according to this embodiment employs a tandem system in which the photoconductive drums 121Y, 121M, 121C, and 121K that bear yellow (Y), magenta (M), cyan (C), and black (K) toner images, respectively, are arranged along the conveyance belt 122 serving as an endless rotator. For example, the conveyance belt 122 bears an intermediate transfer toner image to be transferred onto a sheet P conveyed from the sheet tray 101. The plurality of photoconductive drums 121K, 121C, 121M, and 121Y is aligned in this order from the upstream photoconductive drum 121K to the downstream photoconductive drum 121Y in a rotation direction D122 of the conveyance belt 122.

Electrostatic latent images formed on surfaces of the photoconductive drums 121Y, 121M, 121C, and 121K, respectively, are developed with toner serving as a colorant or a developer into yellow, magenta, cyan, and black toner images. The yellow, magenta, cyan, and black toner images are transferred onto the conveyance belt 122 such that the yellow, magenta, cyan, and black toner images are superimposed on a same position on the conveyance belt 122. Thus, a full color toner image is formed on the conveyance belt 122. The transfer roller 123 transfers the full color toner image formed on the conveyance belt 122 onto the sheet P at a transfer nip where the conveyance belt 122 is closest to the main conveyance path $R_1$.

The image forming portion 120 further includes a fixing roller pair 124 that is disposed downstream from the transfer roller 123 in the sheet conveyance direction DP. The fixing roller pair 124 is constructed of a driving roller and a driven roller. A motor drives the driving roller. The driven roller contacts the driving roller and rotates in accordance with rotation of the driving roller. While the driving roller and the driven roller sandwich the sheet P and rotate, the fixing roller pair 124 fixes the full color toner image transferred onto the sheet P by the transfer roller 123 on the sheet P under heat and pressure.

The reading portion 130 serves as an image scanner that reads the full color toner image formed on the sheet P by the image forming portion 120. The reading portion 130 is disposed downstream from the fixing roller pair 124 and disposed upstream from the node BP in the sheet conveyance direction DP. The reading portion 130 is disposed opposite the main conveyance path $R_1$. In other words, the reading portion 130 is disposed at a common position where the sheet P passes when the sheet P bears the toner image on the front side of the sheet P and when the sheet P bears the toner image on each of the front side and the back side of the sheet P.

Figure 2:
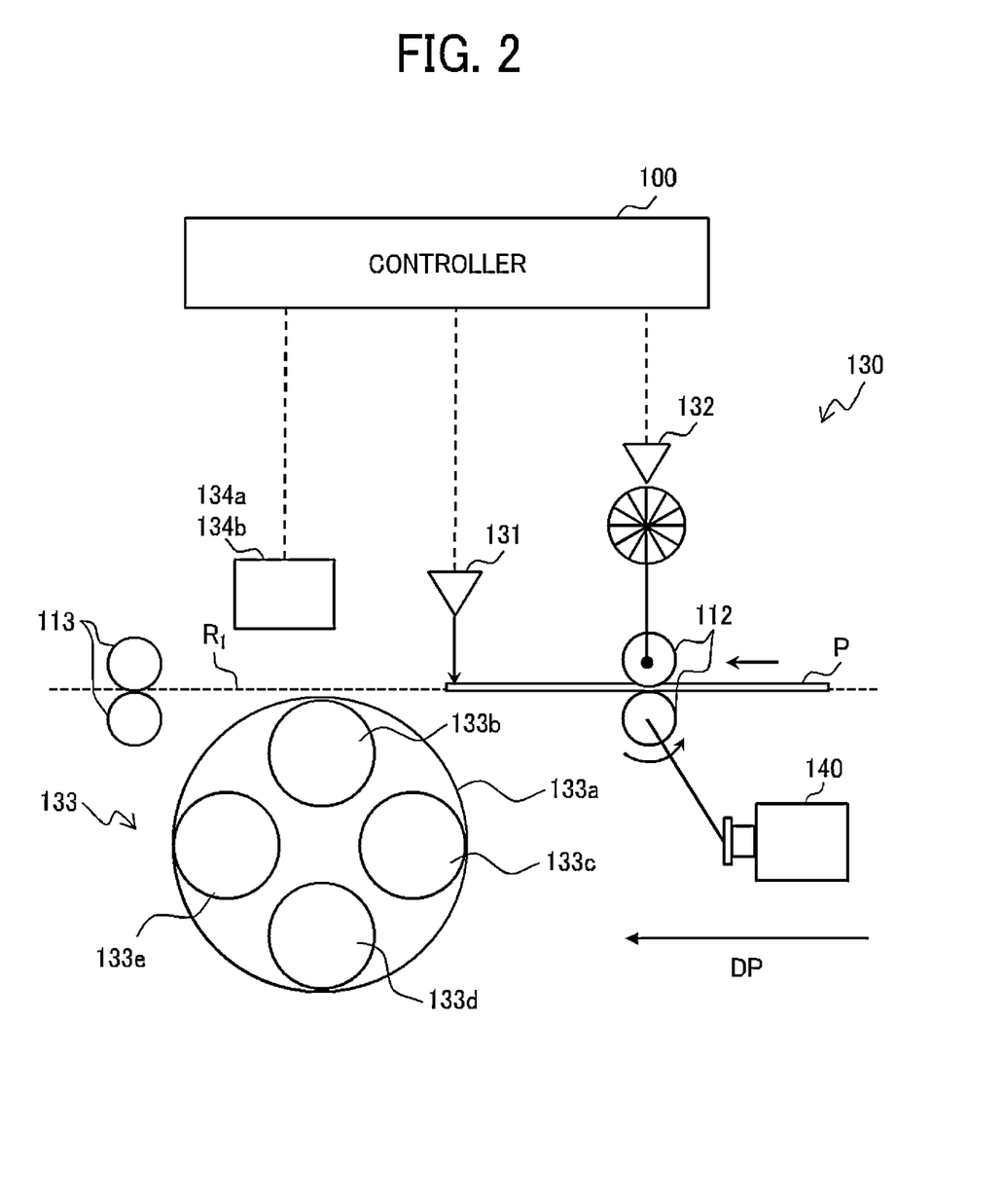
FIG. 2 is a side view of a reading portion incorporated in the image forming apparatus depicted in FIG. 1.
Figure 3:
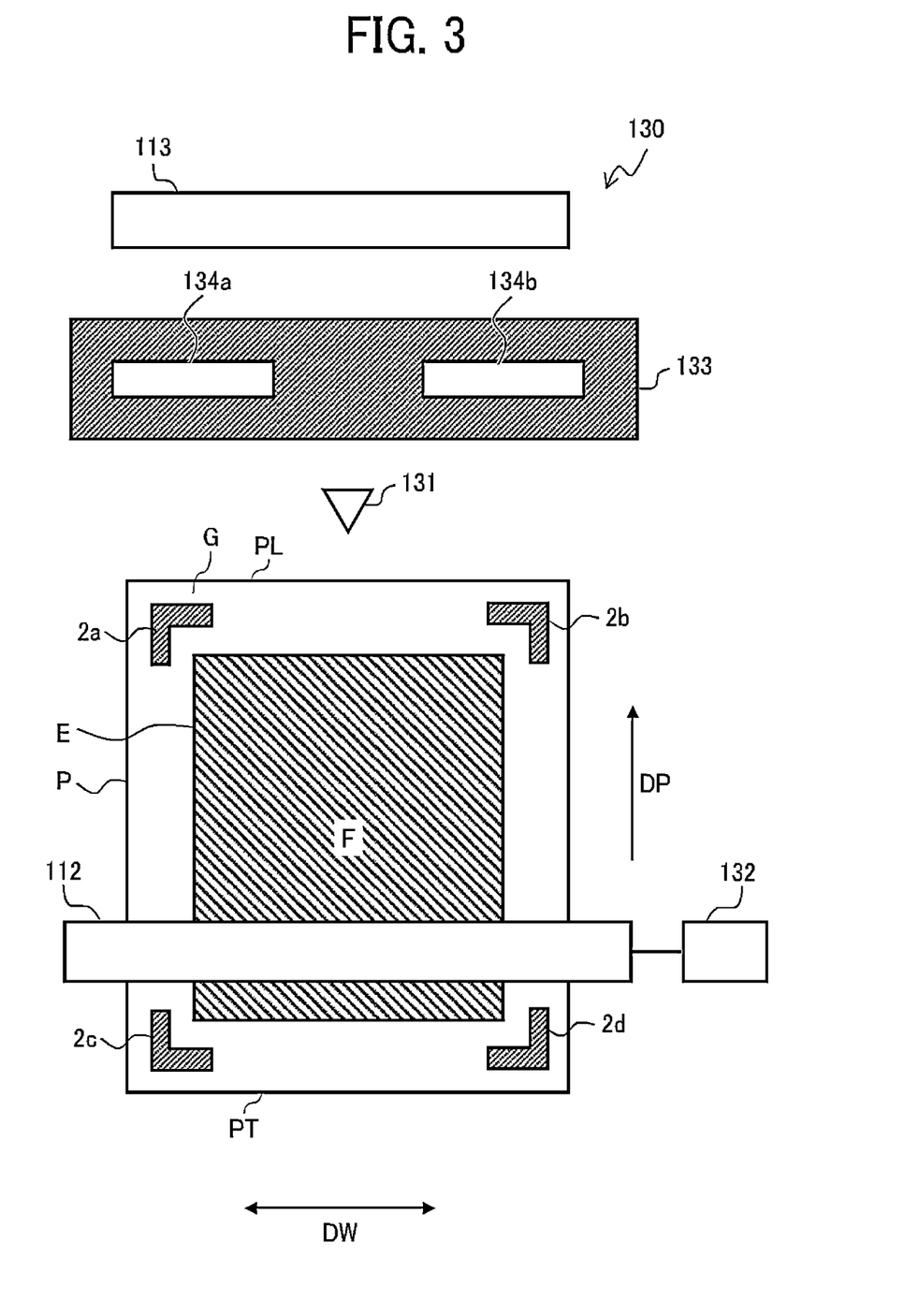
FIG. 3 is a plan view of the reading portion depicted in FIG. 2.

Referring to FIGS. 2 and 3, a description is provided of a construction of the reading portion 130 in detail.

FIG. 2 is a side view of the reading portion 130. FIG. 3 is a plan view of the reading portion 130. As illustrated in FIGS. 2 and 3, the reading portion 130 according to this embodiment mainly includes the conveyance roller pairs 112 and 113, that construct a part of the conveying portion 110, a leading-edge sensor 131, a rotary encoder 132, a background member 133, and scanners 134a and 134b serving as luminance sensors. The leading-edge sensor 131, the rotary encoder 132, and the scanners 134a and 134b are connected to a controller 100 described below.

As illustrated in FIG. 3, the leading-edge sensor 131 is disposed opposite the main conveyance path $R_1$ at a center of the main conveyance path $R_1$ in a width direction DW of the sheet P, that is perpendicular to the sheet conveyance direction DP in which the sheet P is conveyed. The leading-edge sensor 131 detects a leading edge PL of the sheet P conveyed by the conveying portion 110 in the sheet conveyance direction DP. For example, the leading-edge sensor 131 is a reflective photointenupter that emits light toward the main conveyance path $R_1$ and receives reflected light. Specifically, while the leading-edge sensor 131 is not disposed opposite the sheet P, the leading-edge sensor 131 does not receive the reflected light. While the leading-edge sensor 131 is disposed opposite the sheet P, the leading-edge sensor 131 receives the reflected light reflected by the sheet P. While the leading-edge sensor 131 receives the reflected light, the leading-edge sensor 131 outputs a detection signal to the controller 100 depicted in FIG. 2.

The rotary encoder 132 detects a rotation amount of the driven roller of the conveyance roller pair 112. In other words, the rotary encoder 132 outputs pulse signals linked with rotation of the driven roller to the controller 100. The controller 100 accumulates the pulse signals into a number of pulse signals (hereinafter referred to as an encoded value). The controller 100 determines a conveyance amount of the sheet P conveyed by the conveyance roller pair 112 based on the encoded value.

The background member 133 is disposed downstream from the leading-edge sensor 131 in the sheet conveyance direction DP and disposed opposite the main conveyance path $R_1$. The background member 133 includes a holder 133a that is rotatable and a plurality of background rollers 133b, 133c, 133d, and 133e that are held or supported by the holder 133a. The background rollers 133b, 133c, 133d, and 133e extend in the width direction DW of the sheet P. The background rollers 133b, 133c, 133d, and 133e have different surface colors (e.g., luminance values), respectively. As the holder 133a rotates, the holder 133a brings one of the background rollers 133b, 133c, 133d, and 133e to an opposed position disposed opposite the main conveyance path $R_1$, specifically, the scanners 134a and 134b.

As one example, if the sheet P has a white ground color, the background roller 133b, which is black and has a luminance value lower than a luminance value of the sheet P, is disposed opposite the main conveyance path $R_1$. As another example, if the sheet P has a black ground color, the background roller 133c, which is white and has a luminance value higher than a luminance value of the sheet P, is disposed opposite the main conveyance path $R_1$.

The scanners 134a and 134b are disposed downstream from the leading-edge sensor 131 in the sheet conveyance direction DP and disposed opposite the background member 133 via the main conveyance path $R_1$. As illustrated in FIG. 3, the scanner 134a is symmetric with the scanner 134b with respect to a center of the sheet P in the width direction DW thereof when the sheet P is conveyed below the scanners 134a and 134b. Specifically, the scanner 134a is disposed opposite detection marks 2a and 2c and one lateral end (e.g., a left end in FIG. 3) of the sheet Pin the width direction DW thereof. The scanner 134b is disposed opposite detection marks 2b and 2d and another lateral end (e.g., a right end in FIG. 3) of the sheet P in the width direction DW thereof.

Figure 4:
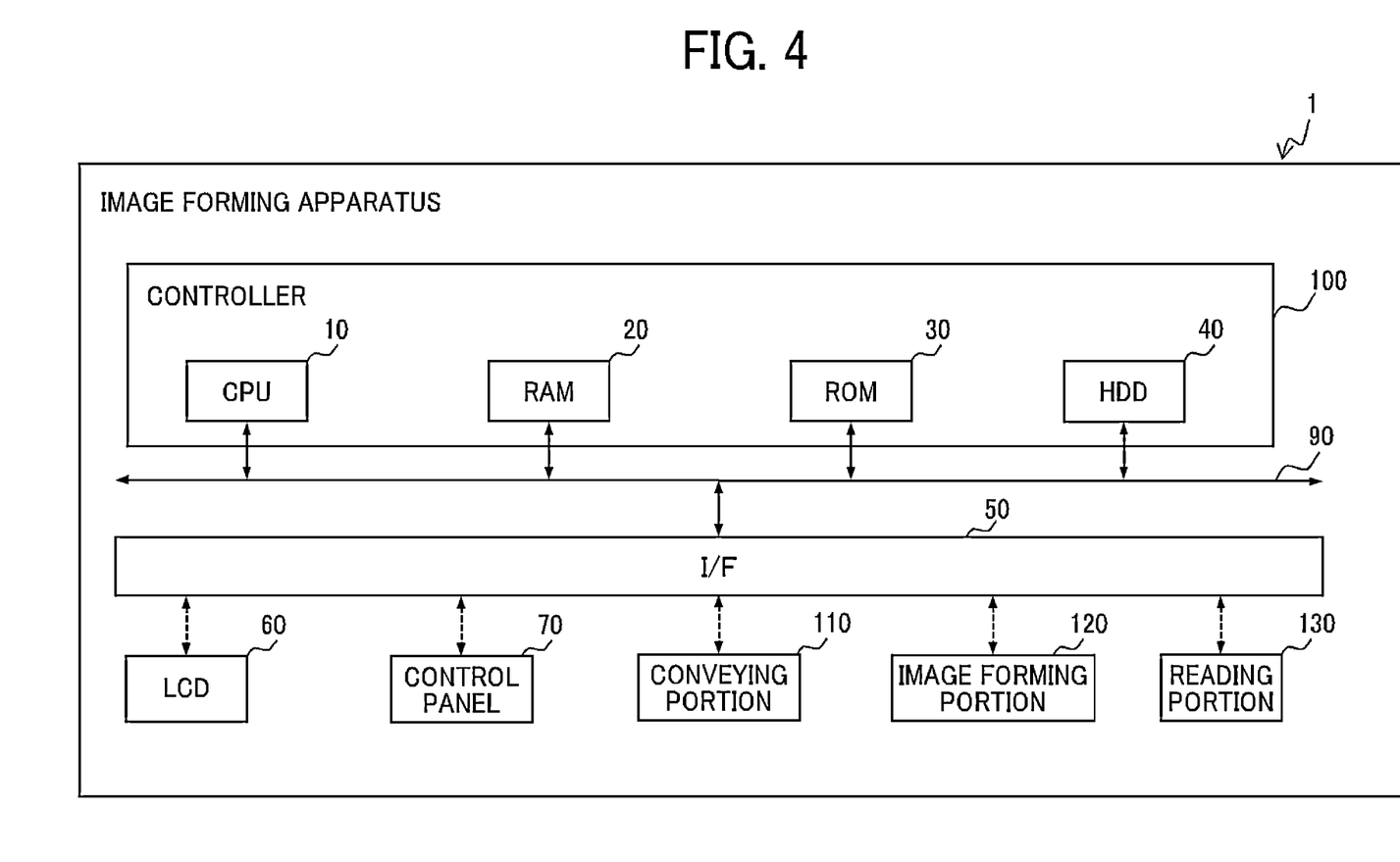
FIG. 4 is a block diagram of the image forming apparatus depicted in FIG. 1, illustrating a hardware configuration thereof.

Each of the scanners 134a and 134b is one example of a luminance sensor that detects the luminance (e.g., a luminance value) of the background member 133 and the sheet P. Each of the scanners 134a and 134b detects a luminance value of an opposed member (e.g., the background member 133 or the sheet P) and outputs a luminance signal indicating the detected luminance value as a detection result to the controller 100. For example, each of the scanners 134a and 134b is a contact image sensor (CIS) constructed of a plurality of image sensors arranged in the width direction DW of the sheet P. However, the luminance sensor is not limited to the scanners 134a and 134b. For example, the luminance sensor may be a reflective photointerrupter, a camera, or the like. FIG. 4 is a block diagram of the image forming apparatus 1, illustrating a hardware configuration thereof. As illustrated in FIG. 4, the image forming apparatus 1 includes a central processing unit (CPU) 10, a random access memory (RAM) 20, a read only memory (ROM) 30, a hard disk drive (HDD) 40, and an interface (I/F) 50 that are connected through a common bus 90. The CPU 10, the RAM 20, the ROM 30, and the HDD 40 construct the controller 100.

The CPU 10 is an arithmetic unit and controls operations of an entirety of the image forming apparatus 1. The RAM 20 is a volatile storage medium that reads and writes data at high speed. The RAM 20 is used as a work area where the CPU 10 processes data. The ROM 30 is a nonvolatile storage medium that reads data and stores programs such as firmware. The HDD 40 is a nonvolatile storage medium that reads and writes data and has an increased storage capacity. The HDD 40 stores an operating system (OS), various control programs, application programs, and the like.

The image forming apparatus 1, using arithmetic operations of the CPU 10, processes control programs stored in the ROM 30, data processing programs (e.g., the application programs) loaded from the storage medium such as the HDD 40 into the RAM 20, and the like, thus configurating a software controller including various functional modules of the image forming apparatus 1. The software controller configured as described above is combined with hardware resources installed in the image forming apparatus 1 to configurate functional blocks that achieve functions of the image thrilling apparatus 1.

The I/F 50 is an interface that connects a liquid crystal display (LCD) 60, a control panel 70, the conveying portion 110, the image forming portion 120, and the reading portion 130 to the common bus 90. The LCD 60 is a display that displays various screens that notify a user of information. The control panel 70 is an input interface that receives various information input by the user. The control panel 70 includes a touch panel and keys superimposed on the LCD 60.

Figure 5:
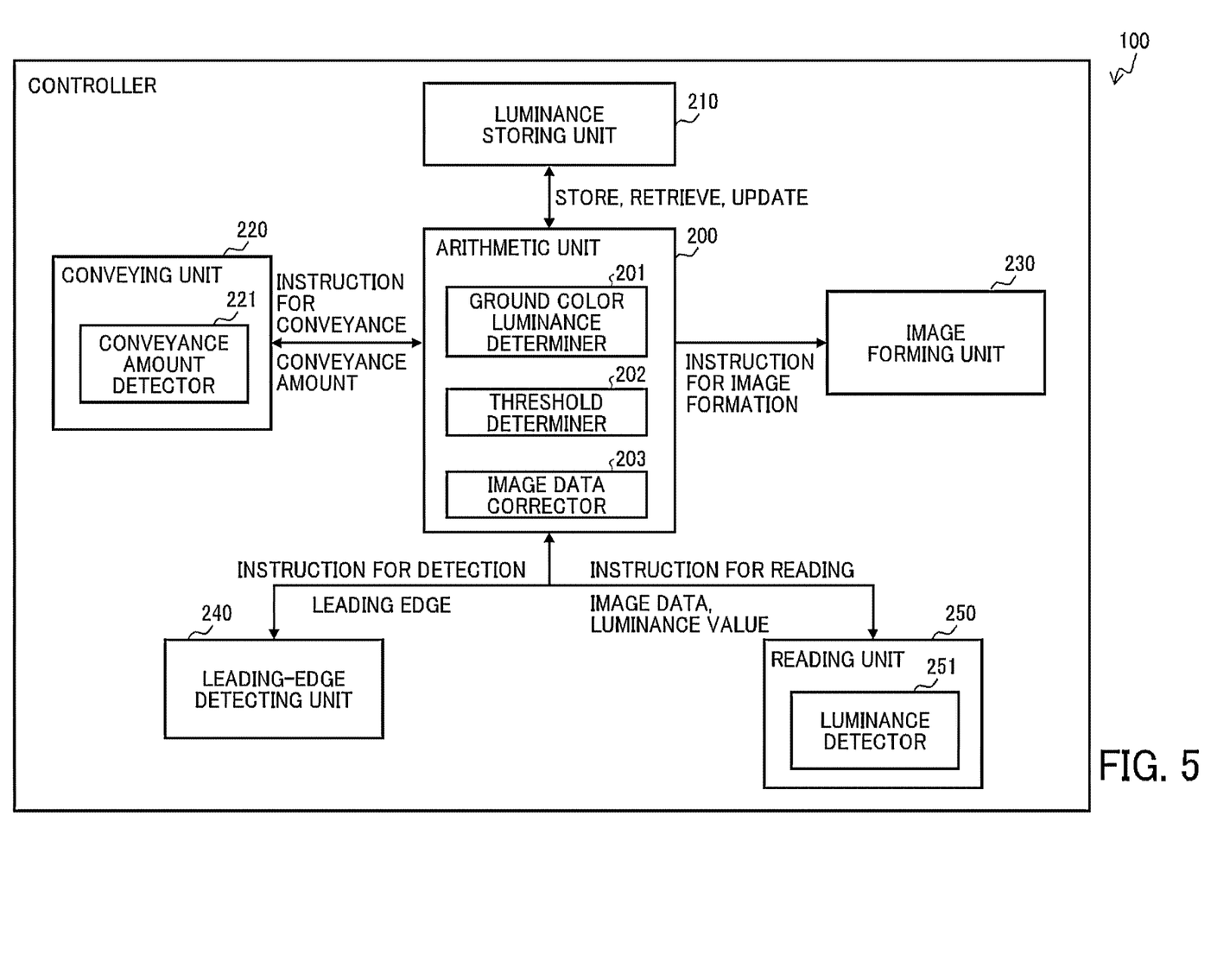
FIG. 5 is a functional block diagram of a controller incorporated in the image forming apparatus depicted in FIG. 4.

FIG. 5 is a functional block diagram of the controller 100. As illustrated in FIG. 5, the controller 100 includes, as the functional blocks (e.g., the functional modules), an arithmetic unit 200, a luminance storing unit 210, a conveying unit 220, an image forming unit 230, a leading-edge detecting unit 240, and a reading unit 250.

The arithmetic unit 200 performs various calculations and instructs operations to other functional blocks. The arithmetic unit 200 includes a ground color luminance determiner 201, a threshold determiner 202, and an image data corrector 203. The ground color luminance determiner 201 determines a luminance value of a ground color area G on the sheet P depicted in FIG. 3. The threshold determiner 202 determines a detection threshold. The image data corrector 203 corrects image data for an image (e.g., a toner image) to be formed on the sheet P (e.g., mainly, a back side image to be formed on the back side of the sheet P).

The luminance storing unit 210 stores, retrieves, and updates a registered luminance value described below with respect to the HDD 40 based on an instruction from the arithmetic unit 200.

The conveying unit 220 operates the conveying portion 110 based on an instruction for conveyance sent from the arithmetic unit 200. Specifically, the conveying unit 220 drives the motor that rotates the driving roller. For example, as illustrated in in FIG. 2, the conveying unit 220 drives a motor 140 that rotates the driving roller of the conveyance roller pair 112. The conveying unit 220 includes a conveyance amount detector 221 that detects the conveyance amount of the sheet P based on pulse signals output from the rotary encoder 132 and notifies the detected conveyance amount to the arithmetic unit 200.

The image forming unit 230 operates the image forming portion 120 based on an instruction for image formation sent from the arithmetic unit 200. Specifically, the image forming unit 230 develops electrostatic latent images formed on the surfaces of the photoconductive drums 121Y, 121M, 121C, and 121K into yellow, magenta, cyan, and black toner images, respectively. The image forming unit 230 transfers the yellow, magenta, cyan, and black toner images onto the conveyance belt 122, thus forming a full color toner image on the conveyance belt 122. The image forming unit 230 controls the transfer roller 123 to transfer the full color toner image transferred onto the conveyance belt 122 onto a sheet P. The image forming unit 230 controls the fixing roller pair 124 to fix the full color toner image transferred onto the sheet P thereon.

The leading-edge detecting unit 240 controls the leading-edge sensor 131 to detect the leading edge PL of the sheet P based on an instruction for detection sent from the arithmetic unit 200. The leading-edge detecting unit 240 notifies the detected leading edge PL of the sheet P to the arithmetic unit 200.

The reading unit 250 controls the scanners 134a and 134b to read the full color toner image on the sheet P based on an instruction for reading sent from the arithmetic unit 200. The reading unit 250 notifies image data indicating the read full color toner image to the arithmetic unit 200. The reading unit 250 includes a luminance detector 251 that controls the scanners 134a and 134b to detect a luminance value of each of the background member 133 and the sheet P and notifies the detected luminance value to the arithmetic unit 200.

Figure 6:
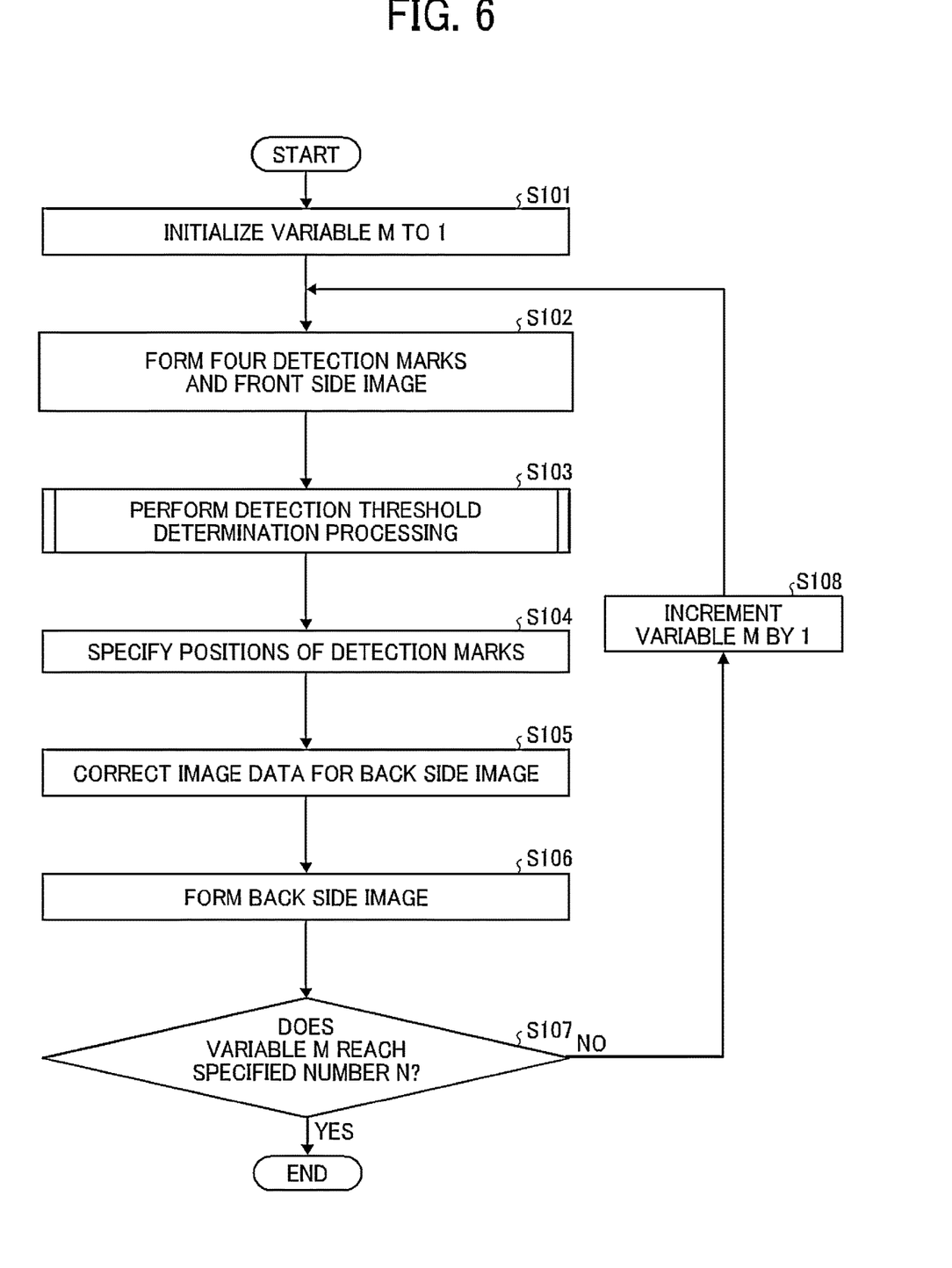
FIG. 6 is a flowchart illustrating continuous printing processing performed by the controller depicted in FIG. 5.
Figure 7:
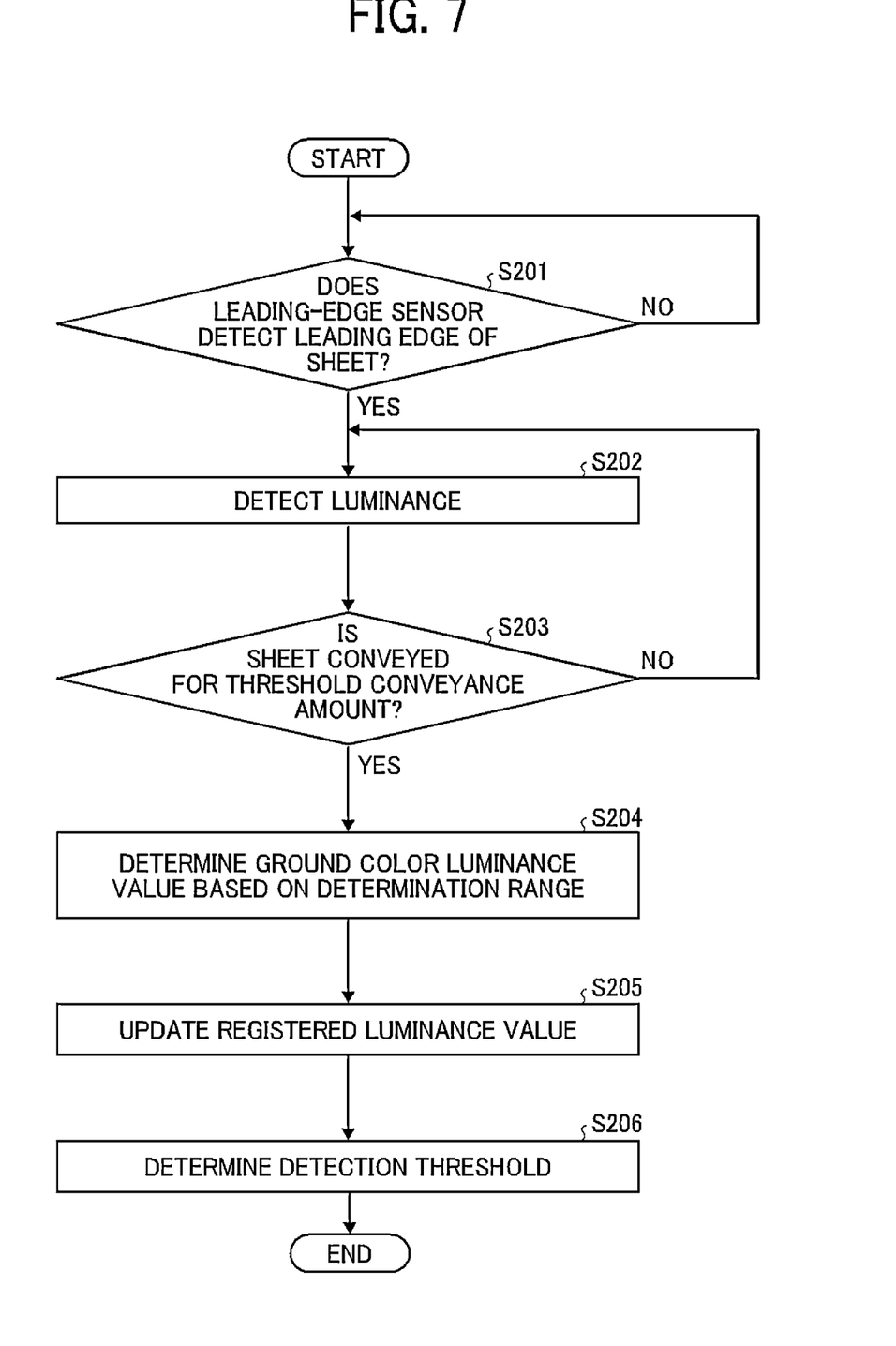
FIG. 7 is a flowchart illustrating detection threshold determination processing performed by the controller depicted in FIG. 5.
Figure 8:
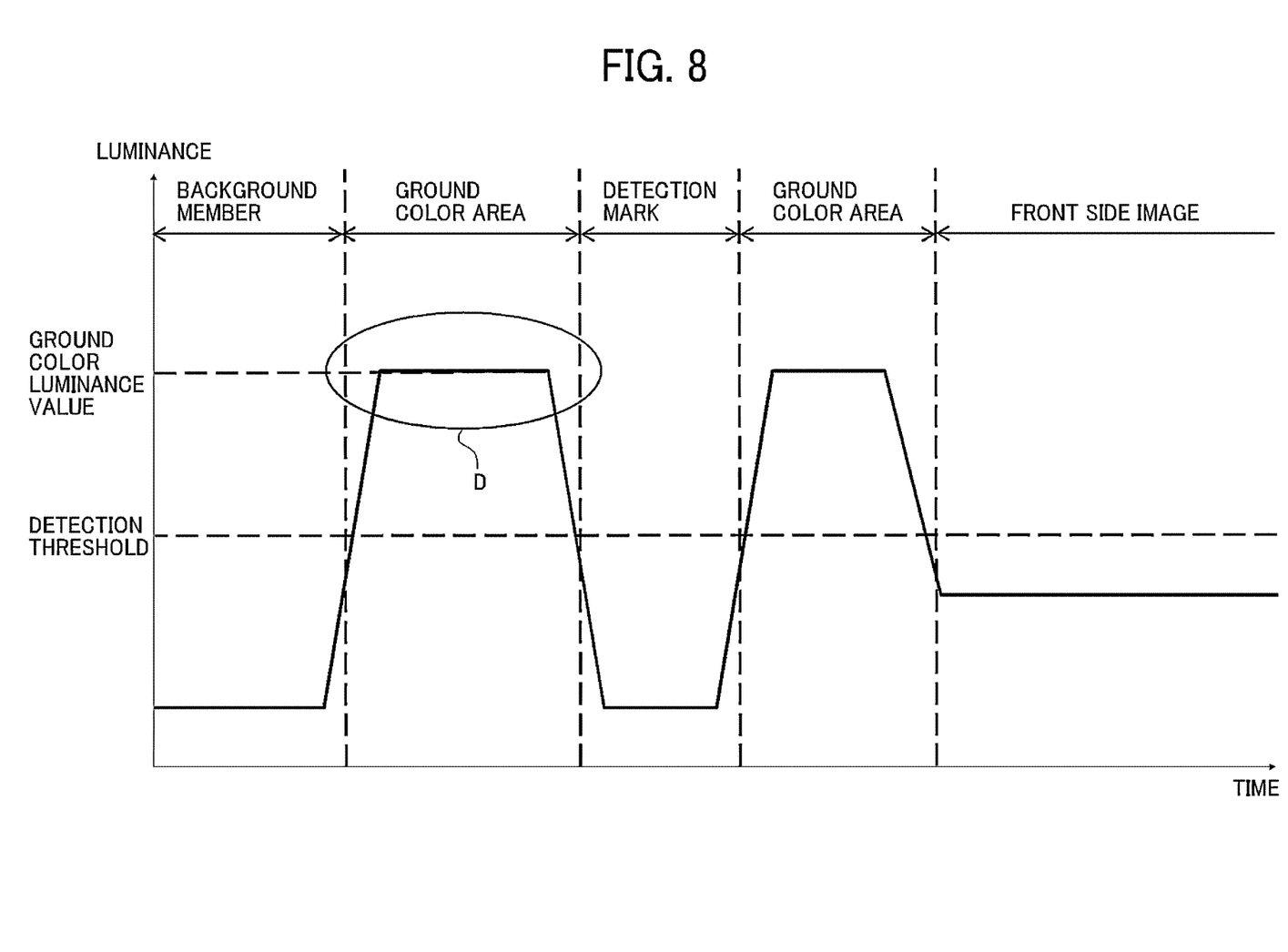
FIG. 8 is a graph illustrating change in a luminance detected by scanners incorporated in the reading portion depicted in FIG. 2 in the detection threshold determination processing.

Referring to FIGS. 6, 7, and 8, a description is provided of continuous printing processing according to an embodiment of the present disclosure.

FIG. 6 is a flowchart illustrating the continuous printing processing. FIG. 7 is a flowchart illustrating detection threshold determination processing. FIG. 8 is a graph illustrating the luminance that is detected by the scanners 134a and 134b in the detection threshold determination processing and changes over time.

The continuous printing processing defines processing to form a toner image on a plurality of sheets P successively. For example, when an operator (e.g., the user) inputs an instruction to perform continuous copying on a plurality of sheets P by using the control panel 70, or when the controller 100 receives an instruction to perform continuous printing on a plurality of sheets P from an external device (e.g., a client computer), the controller 100 starts the continuous printing processing. The instruction for continuous copying or continuous printing specifies the number of sheets P onto which a toner image is to be formed (hereinafter referred to as a specified number N) and images to be formed on the front side and the back side of each of the sheets P.

As illustrated in FIG. 6, in step S101, the controller 100 initializes a variable M stored in the RAM 20 to 1. The variable M indicates the number of sheets P onto which a toner image is to be formed subsequently in the continuous printing processing. In step S102, the controller 100 forms four detection marks 2a, 2b, 2c, and 2d and a specified front side image F illustrated in FIG. 3 on the front side of a first sheet P defined by the variable M of 1.

Specifically, the conveying unit 220 of the controller 100 controls the conveying portion 110 to convey a sheet P picked up from the sheet tray 101 to the position disposed opposite the image forming portion 120 through the main conveyance path $R_1$. The image forming unit 230 of the controller 100 controls the image forming portion 120 to foam the detection marks 2a, 2b, 2c, and 2d and the specified front side image F on the front side of the conveyed sheet P. The conveying unit 220 of the controller 100 controls the conveying portion 110 to farther convey the sheet P bearing the detection marks 2a, 2b, 2c, and 2d and the specified front side image F on the front side of the sheet P. While the sheet P passes through the fixing roller pair 124, the fixing roller pair 124 fixes the detection marks 2a, 2b, 2c, and 2d and the front side image F on the sheet P.

As illustrated in FIG. 3, each of the detection marks 2a, 2b, 2c, and 2d is an image that is substantially L-shaped. The detection marks 2a, 2b, 2c, and 2d are formed in four corners on the sheet P, respectively. Each of the detection marks 2a, 2b, 2c, and 2d is spaced from an edge of the sheet P in the sheet conveyance direction DP thereof For example, the detection marks 2a and 2b are disposed upstream from the leading edge PL of the sheet P in the sheet conveyance direction DP. The detection marks 2c and 2d are disposed downstream from a trailing edge PT of the sheet P in the sheet conveyance direction DP.

The front side image F is disposed in an enclosed area E enclosed by the detection marks 2a, 2b, 2c, and 2d. Conversely, no image is foamed outside the enclosed area E enclosed by the detection marks 2a, 2b, 2c, and 2d. For example, a leading end area on the front side of the sheet P, that is disposed downstream from the detection marks 2a and 2b in the sheet conveyance direction DP, and a trailing end area on the front side of the sheet P, that is disposed upstream from the detection marks 2c and 2d in the sheet conveyance direction DP, retain a ground color even after step S102.

In step S103, the controller 100 performs the detection threshold determination processing illustrated in FIG. 7. The detection threshold determination processing includes processes that determine the detection threshold used to detect the leading edge PL of the sheet P in the sheet conveyance direction DP or the detection marks 2a, 2b, 2c, and 2d in a process for correcting image data for a back side image to be formed on the back side of the sheet P described below in step S105.

Referring to FIG. 7, a description is provided of the detection threshold determination processing under a first condition that the sheet P has a white ground color, a second condition that the black, background roller 133b is disposed opposite the main conveyance path $R_1$, and a third condition that the detection marks 2a, 2b, 2c, and 2d are black and formed on the front side of the sheet P.

For example, according to this embodiment, a luminance value of each of the detection marks 2a, 2b, 2c, and 2d and the background member 133 is lower than a luminance value of the ground color area G on the sheet P.

The conveying unit 220 of the controller 100 controls the conveying portion 110 to convey the sheet P bearing the detection marks 2a, 2b, 2c, and 2d and the front side image F. In step S201, the leading-edge detecting unit 240 of the controller 100 determines whether or not the leading-edge sensor 131 detects the leading edge PL of the sheet P in the sheet conveyance direction DP while the conveying portion 110 conveys the sheet P. Specifically, if the leading-edge detecting unit 240 determines that the leading-edge sensor 131 detects the leading edge PL of the sheet P in the sheet conveyance direction DP, that is, when the leading-edge sensor 131 outputs a detection signal (YES in step S201), the leading-edge detecting unit 240 determines that the leading edge PL of the sheet P in the sheet conveyance direction DP reaches a position disposed opposite the leading-edge sensor 131.

When the leading-edge sensor 131 detects the leading edge PL of the sheet P in the sheet conveyance direction DP (YES in step S201), the luminance detector 251 of the controller 100 controls the scanners 134a and 134b to start detecting the luminance (e.g., a luminance value) of the background member 133 and the sheet P in step S202. In step S203, the controller 100 determines whether or not the sheet P is conveyed for a predetermined threshold conveyance amount. Before the controller 100 determines that the sheet P is conveyed for the predetermined threshold conveyance amount (NO in step S203), the controller 100 controls the scanners 134a and 134b to detect the luminance of the background member 133 and the sheet P at a plurality of times. The controller 100 may control the scanners 134a and 134b to detect the luminance of the sheet P while the sheet P is conveyed. Alternatively, the controller 100 may interrupt conveyance of the sheet P while the scanners 134a and 134b detect the luminance of the sheet P.

For example, as illustrated in FIG. 8, the controller 100 controls the RAM 20 to store a plurality of luminance signals output successively from the scanners 134a and 134b in chronological order. The predetermined threshold conveyance amount is sufficient for the sheet P to be conveyed so that the detection marks 2a and 2b are disposed opposite the scanners 134a and 134b, respectively. The controller 100 may detect that the sheet P is conveyed for the predetermined threshold conveyance amount by counting pulse signals output from the rotary encoder 132 or by using a software timer implemented by the controller 100.

A distance between the leading-edge sensor 131 and the scanners 134a and 134b in the sheet conveyance direction DP, even if the sheet P is skewed or the sheet P suffers from a cutting error, is set to a length that prohibits the sheet P from reaching an opposed position disposed opposite the scanners 134a and 134b when step S202 starts. For example, when step S202 starts, a luminance signal output from the scanners 134a and 134b indicates a luminance value of the background roller 133b.

For example, in steps 5202 and 5203, the luminance detected by the scanners 134a and 134b (hereinafter referred to as a detected value) changes as illustrated with a solid line in FIG. 8. Specifically, the detected value is low while the scanners 134a and 134b are disposed opposite the background member 133 without the sheet P therebetween. When the scanners 134a and 134b are disposed opposite the ground color area G on the sheet P, the detected value increases. When the scanners 134a and 134b are disposed opposite the detection marks 2a and 2b on the sheet P, respectively, the detected value decreases. When the scanners 134a and 134b are disposed opposite the ground color area G on the sheet P again, the detected value increases. When the scanners 134a and 134b are disposed opposite the front side image F on the sheet P, the detected value decreases.

In step S204, the ground color luminance determiner 201 of the controller 100 determines a ground color luminance value, that is, a luminance value of the ground color area G on the sheet P, based on a determination range D illustrated in FIG. 8 that is set within a change trajectory defined by a plurality of luminance values detected at a plurality of times, respectively. The determination range D includes a first peak luminance value among the plurality of detected luminance values. Specifically, the determination range D includes a predetermined number of detected luminance values that are higher and lower than the first peak luminance value.

A peak luminance value denotes a detected luminance value between an increasing trajectory and a decreasing trajectory of the luminance. For example, if a luminance value of each of the detection marks 2a, 2b, 2c, and 2d and the background member 133 is lower than a luminance value of the ground color area G on the sheet P, the peak luminance value indicates a maximum luminance value detected by the scanners 134a and 134b. Conversely, if the luminance value of each of the detection marks 2a, 2b, 2c, and 2d and the background member 133 is higher than the luminance value of the ground color area G on the sheet P, the peak luminance value indicates a minimum luminance value detected by the scanners 134a and 134b.

As one example, if the luminance value of each of the detection marks 2a, 2b, 2c, and 2d and the background member 133 is lower than the luminance value of the ground color area G on the sheet P, the ground color luminance determiner 201 determines the maximum luminance value within the determination range D as the ground color luminance value. If the luminance value of each of the detection marks 2a, 2b, 2c, and 2d and the background member 133 is higher than the luminance value of the ground color area G on the sheet P, the ground color luminance determiner 201 determines the minimum luminance value within the determination range D as the ground color luminance value.

As another example, the HDD 40, as one example of a memory, may store the registered luminance value that defines the luminance value of the ground color area G on the sheet P, which is detected in advance. The ground color luminance determiner 201 may determine a luminance value that defines a minimum difference between the luminance value and the registered luminance value registered in the HDD 40, among the plurality of luminance values included in the determination range D, as the ground color luminance value.

The HDD 40 may store a plurality of registered luminance values that corresponds to a plurality of types of sheets P. The ground color luminance determiner 201 may receive information about the type of the sheet P, that is input by the operator using the control panel 70 and may compare the registered luminance value that corresponds to the input type of the sheet P with the plurality of luminance values included in the determination range D.

In step S205, the luminance storing unit 210 of the controller 100 updates the registered luminance value stored in the HDD 40 with the ground color luminance value determined in step S204. The luminance storing unit 210 may store a representative value (e.g., an average value, a moving average value, and a central value) of the plurality of registered luminance values registered in the past and the ground color luminance value determined this time, as a new registered luminance value. However, if the HDD 40 does not store the registered luminance value, step S205 is omitted.

In step S206, the threshold determiner 202 of the controller 100 determines the detection threshold based on the ground color luminance value determined in step S204. The controller 100 controls the HDD 40 to store the determined detection threshold. For example, the threshold determiner 202 according to this embodiment determines a median (e.g., an average value) of a sum of a ground color luminance value V and a luminance value L of each of the detection marks 2a, 2b, 2c, and 2d as a detection threshold T as indicated by a formula 1 below.

$$T=(V+L)/2 \quad 1$$

Accordingly, as illustrated in FIG. 8, the controller 100 obtains the detection threshold that is smaller than the ground color luminance value and is greater than the luminance value of each of the detection marks 2a, 2b, 2c, and 2d. However, a method for determining the detection threshold is not limited to the examples described above as long as the detection threshold is determined based on the ground color luminance value.

Referring back to FIG. 6, in step S104, the controller 100 specifies the positions of the detection marks 2a, 2b, 2c, and 2d disposed in the four corners on the front side of the sheet P, respectively, by using the detection threshold determined in step S206. In step S105, the controller 100 corrects image data for the shape of the back side image to be formed on the back side of the sheet P according to relative positions with respect to the positions of the detection marks 2a, 2b, 2c, and 2d, respectively, which are specified in step S104. Since steps S104 and S105 are general processes, respectively, a detailed description of steps S104 and S105 is omitted.

In step S106, the controller 100 forms the back side image on the back side of the sheet P according to the image data corrected in step S105. Specifically, the conveying unit 220 of the controller 100 controls the conveying portion 110 to convey the sheet P through the reverse conveyance path $R_2$. The reverse conveyance path $R_2$ reverses the front side and the back side of the sheet P and guides the sheet P to the position disposed opposite the image forming portion 120. The image forming unit 230 of the controller 100 controls the image forming portion 120 to form the back side image on the back side of the sheet P conveyed from the reverse conveyance path $R_2$ according to the corrected image data. The conveying unit 220 of the controller 100 controls the conveying portion 110 to eject the sheet P bearing the back side image onto the output tray 102.

In step S107, the controller 100 determines whether or not the variable M reaches the specified number N. If the controller 100 determines that the variable M does not reach the specified number N yet (NO in step S107), the controller 100 increments the variable M by 1 in step S108 and repeats step S102 and subsequent steps. Conversely, if the controller 100 determines that the variable M reaches the specified number N (YES in step S107), the controller 100 finishes the continuous printing processing.

A description is provided of a configuration of a comparative image forming apparatus.

The comparative image forming apparatus forms a detection mark and a front side image on a front side of a medium. A scanner reads a position of the detection mark formed on the front side of the medium. Based on the read position of the detection mark, the comparative image forming apparatus corrects image data for a back side image to be formed on a back side of the medium and the posture of the medium.

As a method for determining a detection threshold used to detect an edge of the medium and the detection mark, a following method is employed. For example, a rotary encoder counts a conveyance amount of the medium after a leading-edge sensor detects a leading edge of the medium in a medium conveyance direction. At a time when the medium is conveyed for a predetermined conveyance amount, a controller assumes that a ground color area on the medium is disposed opposite the scanner. The controller defines a median between a luminance value of the ground color area on the medium and a luminance value of a background member, which are read by the scanner, as the detection threshold.

However, if the medium is skewed while the medium is conveyed or if a side defined by the leading edge of the medium is not perpendicular to the medium conveyance direction due to a cutting error or the like, the ground color area on the medium may not be disposed opposite the scanner at the time described above when the medium is conveyed for the predetermined conveyance amount. Accordingly, when the controller assumes that the ground color area on the medium is disposed opposite the scanner as described above, the background member or the detection mark may be disposed opposite the scanner. Consequently, the controller may misidentify the luminance value of the ground color area on the medium and may not determine the detection threshold properly.

To address the above-described disadvantages of the comparative image forming apparatus, an image scanner (e.g., the reading portion 130) according to the embodiments of the present disclosure includes a conveyance path (e.g., the main conveyance path $R_1$), a conveyor (e.g., the conveyance roller pairs 112 and 113), a background member (e.g., the background member 133), a luminance sensor (e.g., the scanners 134a and 134b), and a controller (e.g., the controller 100), as illustrated in FIGS. 2 and 3.

The conveyor conveys a medium (e.g., the sheet P) through the conveyance path. The medium bears a detection mark (e.g., the detection marks 2a, 2b, 2c, and 2d) that is spaced from a leading edge (e.g., the leading edge PL) of the medium in a medium conveyance direction (e.g., the sheet conveyance direction DP). The background member is disposed opposite the conveyance path. The luminance sensor is disposed opposite the background member via the conveyance path. The luminance sensor detects a luminance value of each of the background member and the medium. The controller determines a luminance value of a ground color area (e.g., the ground color area G) on the medium. The controller controls the luminance sensor to detect the luminance value at a plurality of times to obtain a plurality of detected luminance values while the conveyor conveys the medium. As illustrated in FIG. 8, the controller determines the luminance value of the ground color area based on a determination range (e.g., the determination range D) including a first peak luminance value among the plurality of detected luminance values.

Accordingly, the controller determines a ground color of the medium properly without being affected by a posture of the medium that is conveyed.

For example, the embodiments described above achieve advantages described below.

According to the embodiments described above, as illustrated in FIG. 8, the determination range D is set within the change trajectory defined by the plurality of luminance values detected at the plurality of times, respectively, while the sheet P is conveyed. The controller 100 determines the luminance value of the ground color area G on the sheet P based on the set determination range D, as the ground color luminance value. Accordingly, even if the sheet P is skewed while the sheet P is conveyed or even if a side defined by the leading edge PL of the sheet P in the sheet conveyance direction DP is not perpendicular to the sheet conveyance direction DP due to a cutting error or the like, the controller 100 determines the ground color of the sheet P properly.

If the controller 100 determines the maximum luminance value or the minimum luminance value as the ground color luminance value, that is, the luminance value of the ground color area G on the sheet P, based on a magnitude correlation between the luminance values of the detection marks 2a, 2b, 2c, and 2d and the background member 133 and the luminance value of the ground color area G on the sheet P, the controller 100 simplifies the processes for determining the luminance value of the ground color area G on the sheet P.

If the controller 100 compares the luminance value detected by the scanners 134a and 134b with the registered luminance value so as to determine the luminance value of the ground color area G on the sheet P, the controller 100 determines the luminance value of the ground color area G on the sheet P more precisely. Additionally, the controller 100 updates the registered luminance value with the ground color luminance value, that is, the determined luminance value of the ground color area G on the sheet P, thus absorbing change in the luminance value caused by degradation over time or the like of the scanners 134a and 134b.

According to the embodiments described above, the controller 100 corrects the image data for the back side image to be formed on the back side of the sheet P by using the detection threshold determined based on the ground color luminance value that is determined. Accordingly, the controller 100 properly detects the positions of the leading edge PL and the trailing edge PT of the sheet P in the sheet conveyance direction DP and the detection marks 2a, 2b, 2c, and 2d, respectively. Consequently, the controller 100 corrects the image data for the back side image properly.

In step S202 depicted in FIG. 7, the controller 100 may use one of the plurality of image sensors incorporated in the scanners 134a and 134b so as to detect the luminance value. Alternatively, the controller 100 may use the plurality of image sensors spaced from each other in the width direction DW of the sheet P so as to detect the luminance value. The controller 100 detects the luminance value at a plurality of positions arranged in the width direction DW of the sheet P, decreasing adverse effects caused by skew and a cutting error of the sheet P.

The image forming portion 120 may employ an image forming system other than the electrophotographic system. For example, the image forming portion 120 may employ an inkjet printing system. In this case, as ink ejected on the sheet P dries, the sheet P may stretch and shrink. The embodiments of the present disclosure are applicable to the image forming portion 120 regardless of the electrophotographic system or the inkjet printing system.

According to the embodiments described above, the image forming apparatus 1 is a printer. Alternatively, the image forming apparatus 1 may be a copier, a facsimile machine, a multifunction peripheral (MFP) having at least two of printing, copying, facsimile, scanning, and plotter functions, an inkjet recording apparatus, or the like.

The above-described embodiments are illustrative and do not limit the present disclosure. Thus, numerous additional modifications and variations are possible in light of the above teachings. For example, elements and features of different illustrative embodiments may be combined with each other and substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image scanner comprising:
   a conveyance path;
   a conveyor configured to convey a medium through the conveyance path, the medium bearing a detection mark that is spaced from a leading edge of the medium in a medium conveyance direction;
   a background member disposed opposite the conveyance path;
   a luminance sensor disposed opposite the background member via the conveyance path, the luminance sensor configured to detect a luminance value of each of the background member and the medium; and
   a controller configured to control the luminance sensor to detect the luminance value at a plurality of times while the conveyor conveys the medium so as to obtain a plurality of detected luminance values,
   the controller configured to determine a ground color luminance value of a ground color area on the medium based on a determination range including a first peak luminance value among the plurality of detected luminance values.

2. The image scanner according to claim 1,
   wherein the controller is configured to determine a maximum luminance value within the determination range as the ground color luminance value if the luminance value of each of the detection mark and the background member is lower than the ground color luminance value.

3. The image scanner according to claim 2,
   wherein the controller is configured to determine a minimum luminance value within the determination range as the ground color luminance value if the luminance value of each of the detection mark and the background member is higher than the ground color luminance value.

4. The image scanner according to claim 1, further comprising a memory configured to store a registered luminance value as the ground color luminance value detected in advance.

5. The image scanner according to claim 4,
wherein the controller is configured to determine a luminance value that defines a minimum difference with respect to the registered luminance value stored in the memory among the plurality of luminance values included in the determination range, as the ground color luminance value.

6. The image scanner according to claim 5,
wherein the controller is configured to update the registered luminance value stored in the memory with the determined ground color luminance value.

7. The image scanner according to claim 1,
wherein the background member includes:
a plurality of background rollers; and
a holder configured to support the plurality of background rollers.

8. An image forming apparatus comprising:
an image forming device configured to form a front side image and a back side image on a front side and a back side of a medium, respectively; and
an image scanner disposed downstream from the image forming device in a medium conveyance direction,
the image scanner including:
a conveyance path;
a conveyor configured to convey the medium through the conveyance path, the medium bearing a detection mark that is spaced from a leading edge of the medium in the medium conveyance direction;
a background member disposed opposite the conveyance path;
a luminance sensor disposed opposite the background member via the conveyance path, the luminance sensor configured to detect a luminance value of each of the background member and the medium; and
a controller configured to control the luminance sensor to detect the luminance value at a plurality of times while the conveyor conveys the medium so as to obtain a plurality of detected luminance values,
the controller configured to determine a ground color luminance value of a ground color area on the medium based on a determination range including a first peak luminance value among the plurality of detected luminance values.

9. The image forming apparatus according to claim 8,
wherein the controller is configured to control the image forming device to form the detection mark in each of four corners on the front side of the medium at a position spaced from one of the leading edge and a trailing edge of the medium in the medium conveyance direction so as to form four detection marks on the medium, and
wherein the controller is configured to control the image forming device to form the front side image in an enclosed area enclosed by the four detection marks.

10. The image forming apparatus according to claim 9,
wherein the controller is configured to determine the ground color luminance value of the ground color area on the medium formed with the four detection marks and the front side image.

11. The image forming apparatus according to claim 10,
wherein the controller is configured to determine a detection threshold used to detect the four detection marks based on the determined ground color luminance value.

12. The image forming apparatus according to claim 11,
wherein the controller is configured to specify positions of the four detection marks formed in the four corners on the front side of the medium, respectively, by using the determined detection threshold.

13. The image forming apparatus according to claim 12,
wherein the controller is configured to correct back side image data for the back side image to be formed on the back side of the medium based on the specified positions of the four detection marks, respectively, and
wherein the controller is configured to control the image forming device to form the back side image on the back side of the medium according to the corrected back side image data.

14. An image forming method comprising:
forming a detection mark in each of four corners on a front side of a medium at a position spaced from one of a leading edge and a trailing edge of the medium in a medium conveyance direction so as to form four detection marks on the medium;
forming a front side image in an enclosed area enclosed by the four detection marks;
determining a ground color luminance value of a ground color area on the medium formed with the four detection marks and the front side image;
determining a detection threshold used to detect the four detection marks based on the determined ground color luminance value;
specifying positions of the four detection marks formed in the four corners on the front side of the medium, respectively, by using the determined detection threshold;
correcting back side image data for a back side image to be formed on a back side of the medium based on the specified positions of the four detection marks, respectively; and
forming the back side image on the back side of the medium according to the corrected back side image data.

* * * * *